C. S. BATDORF.
MACHINE FOR BANDING BILLS AND THE LIKE.
APPLICATION FILED OCT. 20, 1915.

1,204,118.

Patented Nov. 7, 1916.
7 SHEETS—SHEET 1.

Fig. 1.

WITNESSES:

INVENTOR
Charles S. Batdorf,
BY
ATTORNEY

C. S. BATDORF.
MACHINE FOR BANDING BILLS AND THE LIKE.
APPLICATION FILED OCT. 20, 1915.

1,204,118.

Patented Nov. 7, 1916.
7 SHEETS—SHEET 2.

C. S. BATDORF.
MACHINE FOR BANDING BILLS AND THE LIKE.
APPLICATION FILED OCT. 20, 1915.

1,204,118.

Patented Nov. 7, 1916.
7 SHEETS—SHEET 4.

C. S. BATDORF.
MACHINE FOR BANDING BILLS AND THE LIKE.
APPLICATION FILED OCT. 20, 1915.

1,204,118.

Patented Nov. 7, 1916.
7 SHEETS—SHEET 5.

Fig. 5.

UNITED STATES PATENT OFFICE.

CHARLES S. BATDORF, OF BROOKLYN, NEW YORK.

MACHINE FOR BANDING BILLS AND THE LIKE.

1,204,118.　　　　Specification of Letters Patent.　　Patented Nov. 7, 1916.

Application filed October 20, 1915.　Serial No. 56,848.

*To all whom it may concern:*

Be it known that I, CHARLES S. BATDORF, a citizen of the United States, and a resident of Brooklyn, in the county of Kings and State of New York, have invented certain new and useful Improvements in Machines for Banding Bills and the like, of which the following is a specification.

The invention relates more particularly to the banding of bundles of bills in banking houses and the like. It is well known that in banks and other places handling large amounts of money, bills of the same denomination are placed in bundles each containing a specified number of bills and that these bundles are banded by means of a strip of paper drawn transversely around each bundle and having its ends pinned together and to the outer bills of the bundle. The total value of the bills in the bundle is indicated by a notation placed on the band. It is customary, for instance, with respect to one dollar bills to place one hundred of the bills in a bundle and then apply the band to the bundle. Various schemes have been devised for the manual banding of bundles of bills, but the system commonly employed is to apply a strip of paper transversely around a bundle and pin its overlapping ends together, all this work being performed by hand.

My invention comprises a machine by means of which the bundles of bills may be rapidly and effectually banded without the use of pins and the like, my machine comprising means whereby a strip of paper of the proper length placed on the bed of the machine may be nicely wrapped around a bundle of bills placed upon the strip transversely of the bed of the machine and also means for moistening an adhesive surface carried by one end of the strip and ironing down that end of the strip possessing the adhesive substance upon the other end of the strip, the two ends of the strip being at that time overlapped. My machine possesses a downwardly yielding concave bed to receive the bundle of bills placed across the banding strip and a presser or platen to be manually depressed upon the bundle of bills while the latter is upon said concave bed, said presser or platen having a convex lower surface and adapted when depressed upon the bills to concave the same and also, at its upper side, to receive the ends when overlapped of the binding strip, the upper surface of the platen or presser affording a bed upon which the ends of the binding strip are overlapped and secured together. Upon the elevation of the platen or presser, said platen or presser carries the bundle of bills with it and the bundle is then slid transversely from the platen and flattened out. The flattening out of the bundle of bills results in the bills taking up that portion of the length of the band which extended over the upper side of the platen or presser, thereby leaving the bundle flat and with the band snugly secured around the same.

The machine of my invention has been designed more particularly for the rapid and convenient banding of bundles of bank notes, bills, or paper money in banks and other establishments handling bills in large quantities, but these bills are in effect strips of paper or other flexible material of substantially uniform dimensions, and the strips might represent notes, checks, invoices or other documents capable of being banded by my machine, and therefore I employ the term "bills" herein in a generic sense, not desiring to confine the invention to the banding of paper money as distinguished from banding bundles of strips of other character.

The invention presented herein embodies certain improvements on the machine and invention made the subject of Letters Patent No. 1,190,848 granted to me July 11, 1916, for machine for banding bills and the like.

My invention will be fully understood from the detailed description hereinafter presented, reference being had to the accompanying drawings in which.

Figure 1:
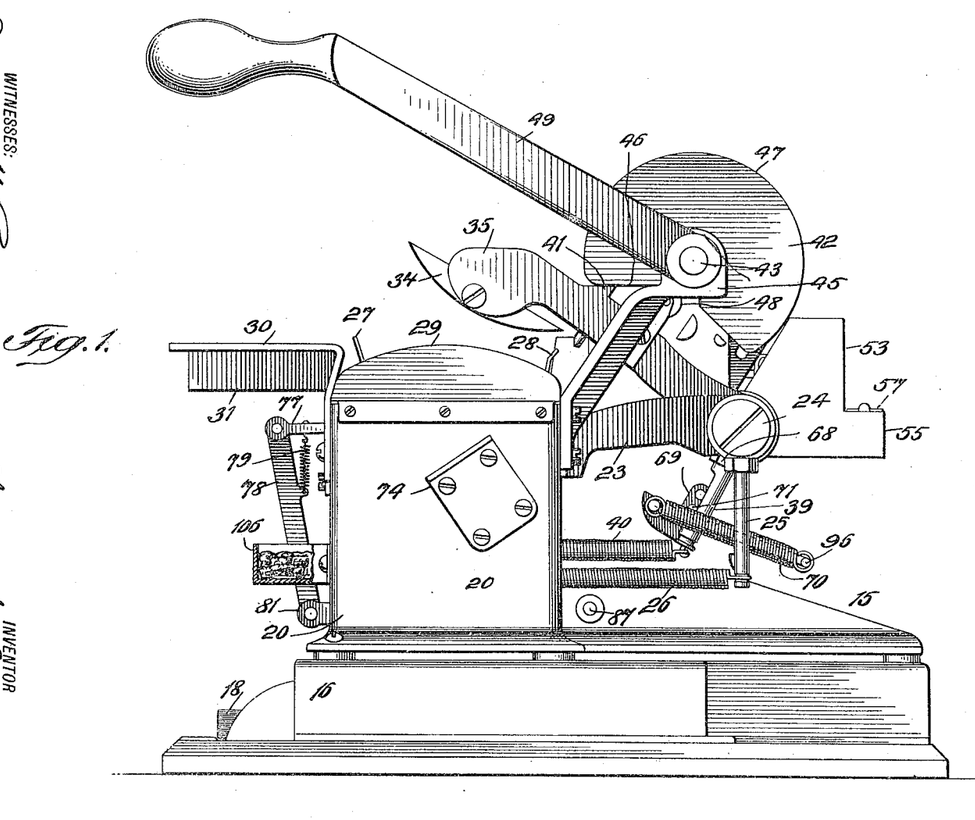
Figure 1 is a side elevation, partly in section, of a machine constructed in accordance with and embodying my invention.
Figure 9:
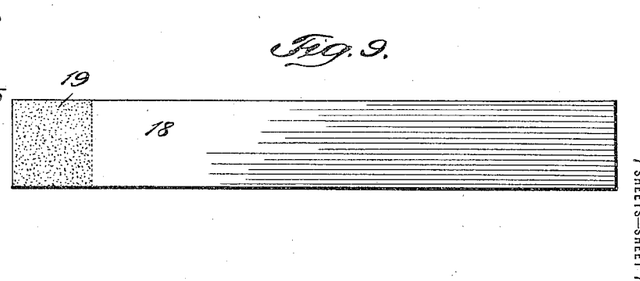
Fig. 9 is a detached top view of one of the binding strips used for wrapping the bundle of bills.

In the drawings 15 designates the general frame of the machine mounted upon a base frame 16 which affords a series of chambers 17 for the various binding strips 18 to be applied to the bundles of bills, the strips being exposed at their front ends, as shown in Fig. 1, so that the user of the machine may readily withdraw any of the strips he may desire to use. Strips 18 will vary in color for bundles of different values and also bear proper notations for the bundles of different values, such as $25, $50, $100, $250, $500, $1000 and so on. In physical structure the strips 18 are all alike and each strip, as shown in Fig. 9, has upon what is to be its inner surface near one end a coating of adhesive substance 19, this substance being dry and requiring to be moistened when the strip is to be applied to a bundle of bills.

The frame 15 is a hollow casting and of suitable shape and proportions to receive the operative mechanism of the machine. The frame 15 has at its front portion a rectangular box-like section 20 which projects laterally beyond the general sides of the machine.

Within the upper portion of the box-like section 20 is located the bed or frame 21 upon which the bundles of bills are bound. I number the bundle of bills present on the machine as 22. The bed 21 has a concave upper surface and is fastened upon the forward end of an arm 23 which is pivotally secured by means of a screw stud 24 and has connected with it a depending arm 25 which is engaged by a coiled spring 26 whose tension is exerted to turn the arm 23 and bed 21 upwardly or to the position illustrated in Fig. 3, which is the normal position for the bed. The bed 21 is provided at its front and rear edges with upwardly extending plates 27—28 respectively to serve as guides to the user in placing the bundle of bills over the bed 21 and to aid in retaining the said bills evenly during the operation of the machine. The box-like section 20 has at its right hand edge an upwardly extending plate 29 against which one end of the bundle of bills will be placed when introducing the same to the machine. The plate 29 serves as a guide for correctly locating the bundle and as an aid to the user in placing the bundle on the machine.

Figure 3:
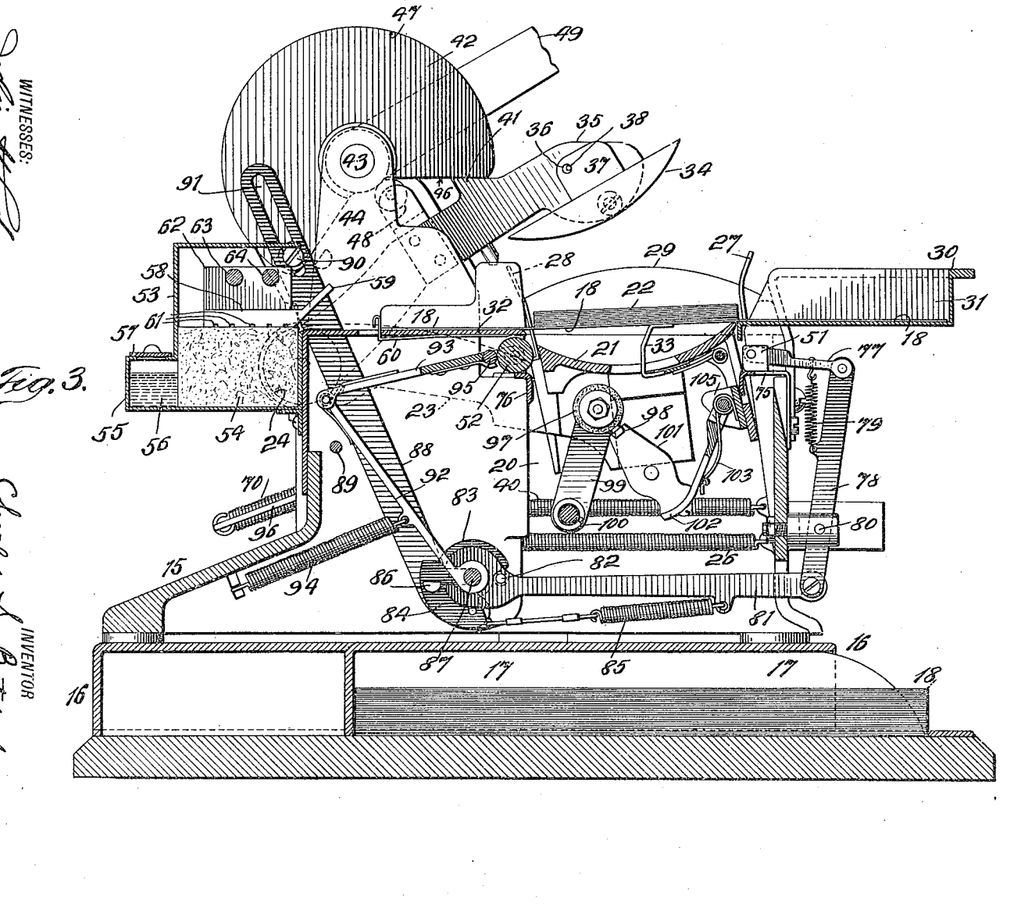
Fig. 3 is a longitudinal section, partly broken away, through the machine taken on the dotted line 3—3 of Fig. 6, the parts of the machine being shown in normal position and a binding strip with a bundle of bills thereupon being shown as having been applied to the bed of the machine preparatory to the bills being wrapped by the strip upon the machine being operated.

At the front of the machine is secured a bed plate 30 having a depressed section 31 of appropriate width and length to receive one end portion of one of the strips 18. At the rear of the box-like section 20 and in line with the depressed portion 31 of the bed plate 30 is provided a table 32 for the rear end of the strip 18, as shown in Fig. 3, the end of the strip bearing adhesive substance 19 being the end which is placed on the table 32 and always with the adhesive surface facing upwardly preparatory to the same being moistened while on said table. I provide the bed 21 with a yielding or spring finger 33 which projects upwardly through a slot formed in said bed, as shown in Fig. 3 and normally stands on a level with the depressed portion 31 of the bed plate 30 and the table 32, and the finger 33 serves as means for aiding in the support of the middle portion of the binding strip 18 extending over said bed plate and table. The finger 33 also aids in supporting the bundle of bills 22 when placed transversely upon the binding strip 18. On the depression of the bed 21 and the bundle of bills 22 the spring finger 33 yields downwardly through the slot in the bed 21 and thus does not interfere with the strip and bundle being firmly depressed upon the concave surface of the bed 21, as illustrated in Fig. 4.

The means for depressing the bundle of bills upon the bed 21 and causing said bed to move downwardly to the proper extent, comprises a presser or platen 34 which is carried by a forwardly extending arm 35 and is permitted to have a slight swiveling motion thereon.

The swiveling action of the presser or platen 34 is controlled by the hole 36 in the extension 37 of said platen and the small pin 38 which projects laterally from the arm 35 into said hole 36 (Fig. 3). The arm 35 is pivotally mounted at its rear end on the screw stud 24 and said arm has a depending rod or auxiliary arm 39 to which a coiled spring 40 is connected, the spring acting normally to hold the platen or presser 34 in its upper position. The arm 35 is formed with a projection or cam surface 41 and this projection is below a portion of the cam 42 secured on a shaft 43 which has a bearing in the side portion 44 of the general frame of the machine and also in the upper end of a bracket arm 45 fastened to the rear side of the box section 20 of the machine frame. The cam 42 has an inwardly extending flat surface 46 which first acts against the projection 41 on the arm 35, and a uniform surface 47 on the arc of a circle which finally engages and rides against a roller 48 carried by said arm. The presser or platen always moves downwardly to a uniform position, and any variations in the thicknesses of the bundles of bills are taken care of by the more or less depression of the bed 21. The lower position of the presser or platen 34 is shown in Fig. 4. On the shaft 43 carrying the cam 42 is provided a lever arm 49 for manual operation, and upon the shaft 43 is provided a coiled spring 50 whose tension is exerted to aid in maintaining the lever arm 49 in its upper position. When the lever arm 49 is manually turned downwardly it causes the cam 42, acting against the arm 35, to depress the platen or presser 34 against the bundle of bills 22 resting on the binding strip 18, said presser or platen passing from its initial position shown in Fig. 3 to its completely depressed position shown in Fig. 4.

Figure 4:
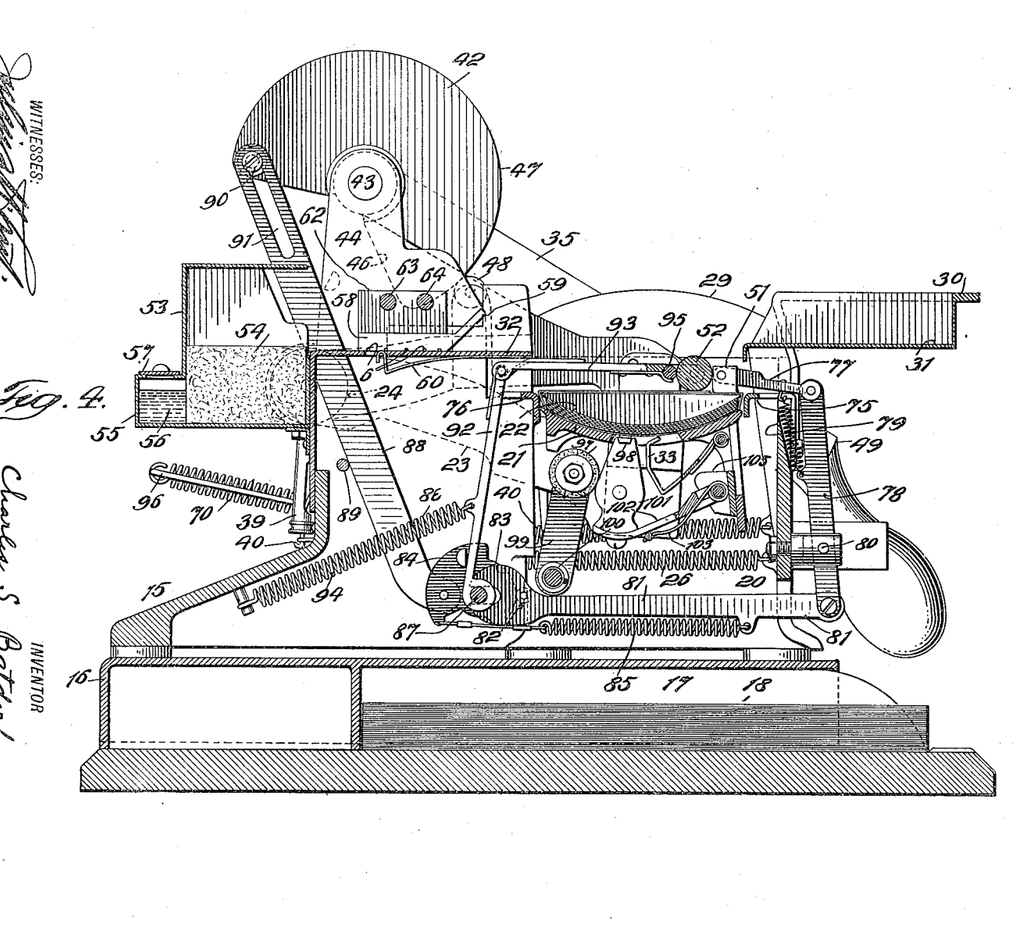
Fig. 4 is a section corresponding with Fig. 3 but illustrating the machine as having been operated by the depression of the operating lever or handle.
Figure 5:
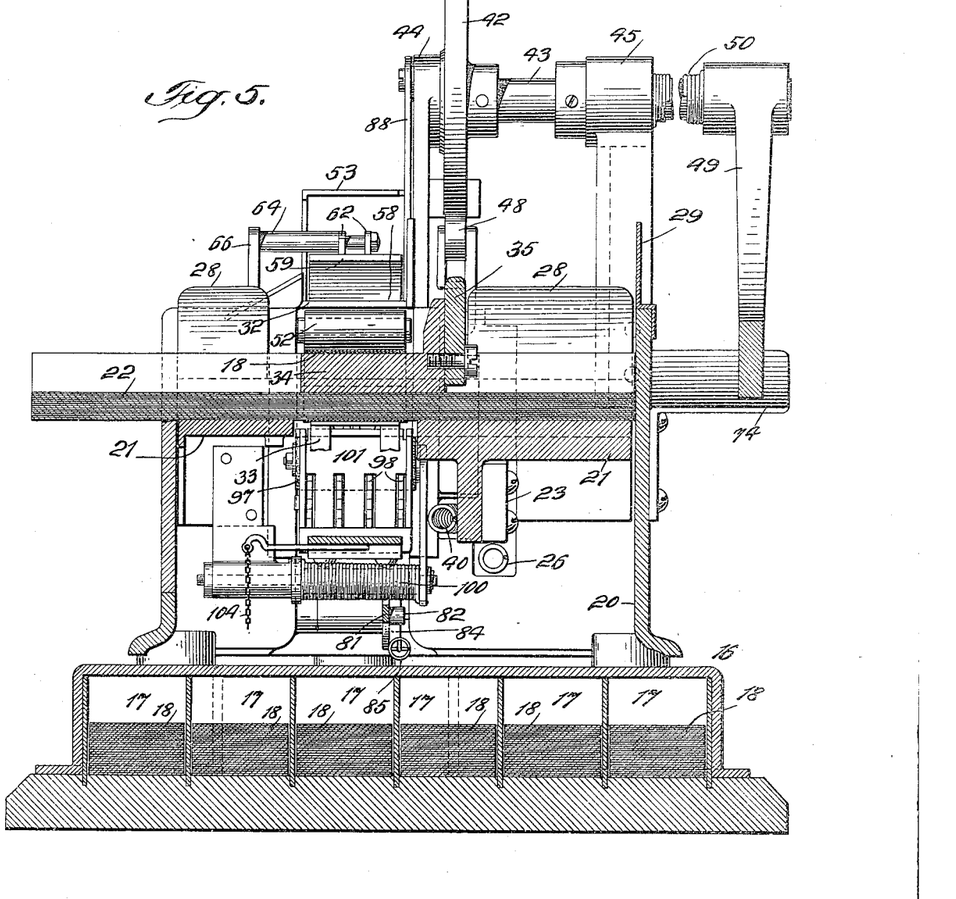
Fig. 5 is a vertical transverse section through the machine taken on the dotted line 5—5 of Fig. 6, the parts of the machine being shown in an operative position, and the bundle of bills being illustrated in position upon the concave bed plate and below the convex presser or plunger.
Figure 6:
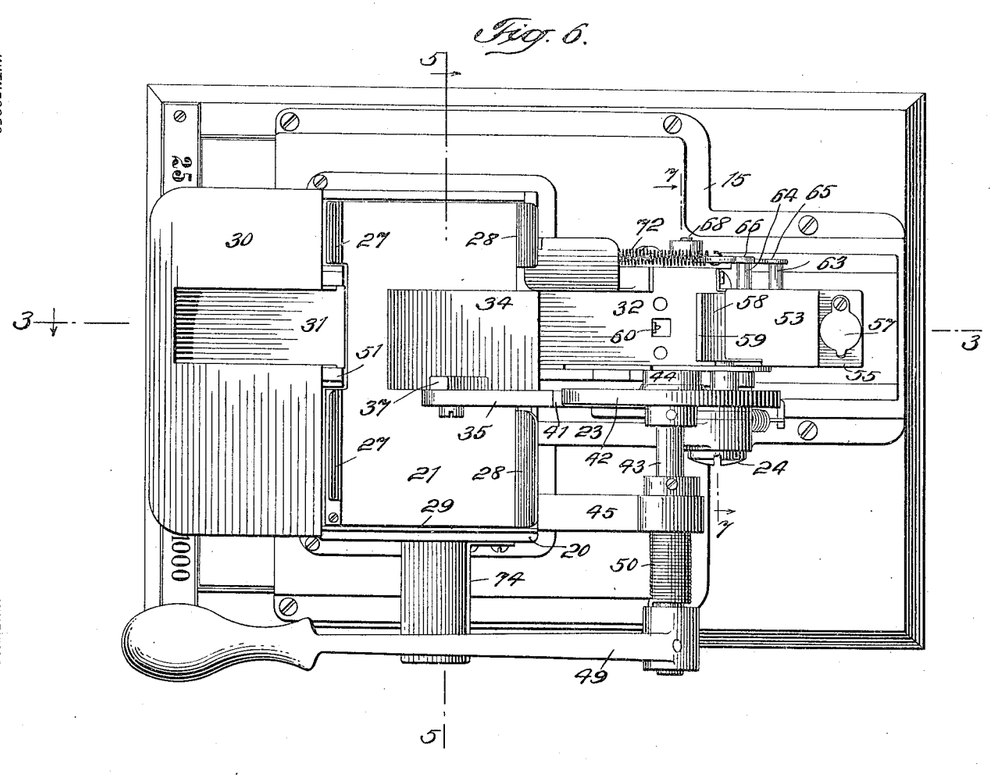
Fig. 6 is a top view of the machine, all the parts being in normal position.
Figure 7:
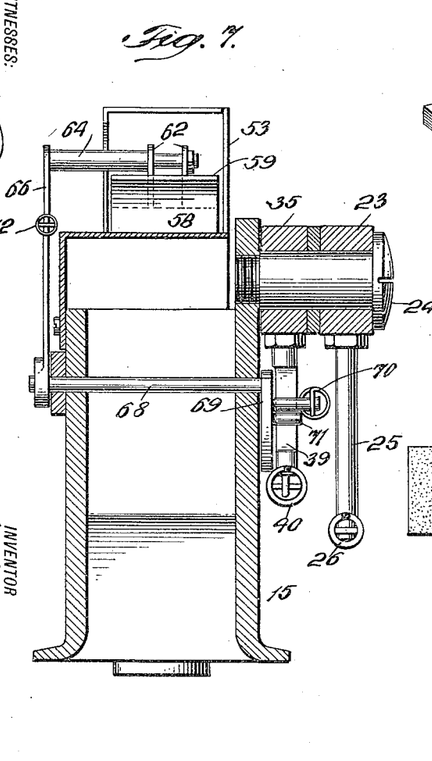
Fig. 7 is a transverse section through a portion of the machine taken on the dotted line 7—7 of Fig. 6.
Figure 8:
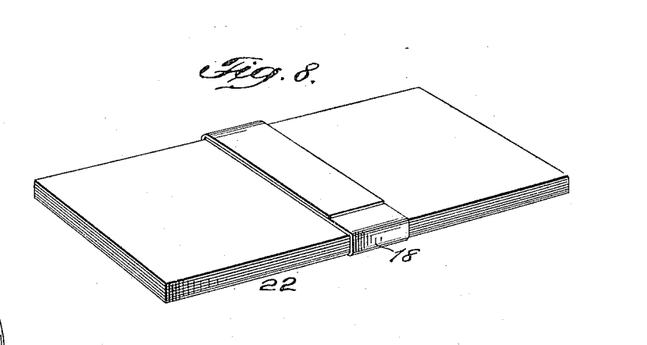
Fig. 8 is a perspective view of a bundle of bills confined within a wrapper or strip and illustrates the product of the machine.

When the lever arm 49 is depressed, after the strip 18 has been positioned on the machine and a bundle of bills 22 placed crosswise of the same, as shown in Fig. 3, several functions are performed by the operative mechanism, one being that the adhesive substance 19 on the rear end of the strip 18 is moistened, another being that the forward end of the strip 18 is by means of a shoe 51 folded over upon the upper surface of the presser or platen 34, and still another being that a roller 52 is caused to fold the rear end of the strip 18, then having had its adhesive substance 19 moistened, over upon the bundle of bills and upon the rearwardly folded-over front end of said strip, the roller 52 operating to iron down the adhesive end of the strip 18 upon the forward or non-adhesive end of said strip and causing said two ends to adhere one to the other upon the upper surface of the presser or platen 34 then engaged in flexing and holding down the bundle of bills 22, as will be understood by reference to Fig. 4. Upon each elevation of the lever 49 the platen or presser 34 ascends and elevates the strip 18, then folded upon it, with the flexed bundle of bills 22, and the bundle of bills is then, together with the strip withdrawn laterally from the presser or platen 34, after which the bills 22 are flattened out and by their extension thus caused draw the strip 18 tautly around the same or in other words tightly fill the band formed by the strip.

The means for moistening the gum substance 19 on the strip 18 on the descent of the lever arm 49 will now be described.

Upon the rear of the general frame of the machine is secured a box receptacle 53 having an open front and containing a body of felt or other liquid holding substance 54. The lower rear portion of the box 53 opens into an auxiliary receptacle 55 into which water 56 may be poured through an opening in the top of said receptacle and which opening may be controlled by a pivoted cover 57. The liquid 56 constitutes a reservoir from which the felt or other body or pad 54 may take its moisture. I provide a movable shoe or plate 58 which is adapted to enter the receptacle 53 and engage the top of the pad or body 54 for taking moisture therefrom and this shoe 58 is at its proper time and during the depression of the lever arm 49 carried from the box or receptacle 53 and lowered directly upon the adhesive end of the strip 18 or to the position in which said shoe is illustrated in Fig. 4, this being for the purpose of conveying moisture obtained from the body or pad 54 to the substance 19 on said strip 18. The shoe 58 will preferably be of metal and has an upwardly and forwardly deflected front end 59 in the shape of a plate which when the shoe 58 is moved forwardly will engage the rear upwardly projecting end of a spring 60 and cause said end to be depressed through the bed plate or table 32 and thus enable the lower surface of the shoe 58 to engage the adhesive substance on the strip 18. I may here say that the upwardly projecting end of the spring 60 serves as a stop or gage for the rear end of the strip 18 when the latter is placed on the machine and also serves as a guard to prevent the shoe 58 from rolling up or distorting the rear end of the strip 18 prior to descending directly thereupon. The shoe 58 is formed with a series of transverse grooves 61 which aid in conveying moisture from the body or felt 54 to the adhesive end of the strip 18 and also facilitate the withdrawal of said end of said strip from below the said shoe 58 by the roller 52 when the latter starts forwardly to fold said end of said strip upon the other or rearwardly folded forward end of said strip.

Figure 2:
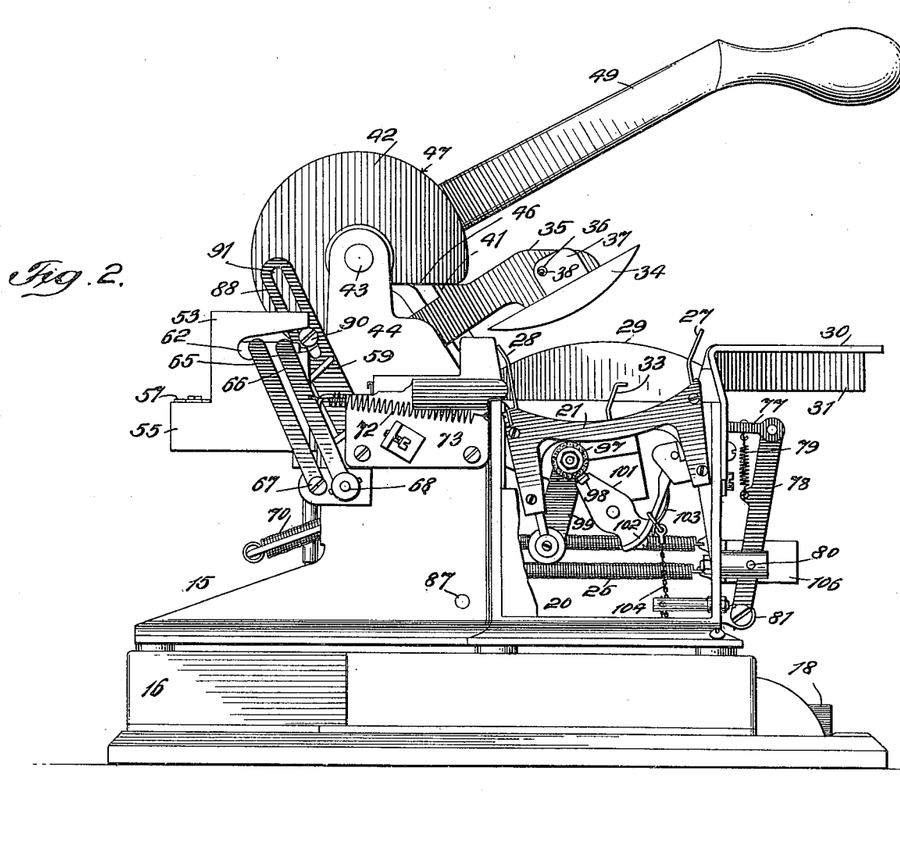
Fig. 2 is a side elevation taken from the other side of the machine, Figs. 1 and 2, showing the parts of the machine in normal position.

The shoe 58 has upwardly extending flanges 62 and these flanges afford bearings for transverse shafts 63 and 64 whose outer ends are connected with parallel arms 65—66 respectively (Fig. 2) which initially extend downwardly and forwardly and one of which, to wit, 65 is pivotally secured, as at 67 on a screw stud extending from the side of the machine and the other of which, to wit, 66 is secured at its lower end upon a transverse shaft 68 which has secured upon its right hand end a bell-crank plate 69 from which said shaft is operated and which has connected with it a coiled spring 70 and also a pin 71 which has a bearing against the arm 39 connected with the lever arm 35. The spring 70 keeps the pin 71 against the arm 39 until the moistening shoe 58 reaches and settles upon the adhesive end of the strip 18, and said arm 39 by its engagement with the pin 71 restrains this spring 70 from acting on the shaft 68 until the lever arm 49 and lever arm 35 have descended to a suitable extent to render it proper for the moistening shoe 58 to engage the rear end of the strip 18. After the shoe 58 has passed into engagement with the rear end of the strip 18 the arms 49, 35 have a further descending movement and the arm 39 leaves the pin 71 of the bell-crank plate 69, but during this movement the spring 70 is held under restraint from the fact that said shoe 58 is then upon the rear end of the strip 18. The bell-crank plate 69 is rigidly connected with the shaft 68 and hence when the spring 70 turns the lower portion of the plate 69 downwardly and rearwardly, during the rearward movement of the arm 39, said plate rocks or imparts a partial rotation to the shaft 68 and this shaft acting through the crank arm 66 causes the shoe 58 to move forwardly and settle upon the rear end of the strip 18. The additional arm 65 connected with the shoe 58 is provided for the purpose of steadying the movement of said shoe and of causing it to have final movements, parallel, respectively, with the bed plate or table 32 and pad or moist body 54. I also provide a light spring 72 connected with the arm 66 for imparting a forward tension to said arm and a downward pressure of the shoe 58 upon the adhesive end of the strip 18 when said shoe is in its forward position. I also provide an adjustable stop 73 for the arm 66 when the latter is in its forwardly turned position, this stop serving to arrest said arm and the shoe 58 connected with it so that only a proper amount of pressure shall be exerted by said shoe against the adhesive end of the strip 18. When the lever arm 49 is turned to its initial position shown in Figs. 1 and 2 the arm 39 connected with the lever arm 35 will engage the pin 71 and thereby cause the bell-crank plate 69 to reverse the movement of transverse shaft 68 and restore the shoe 58 to its position within the box 53 and upon the moist pad or body 54, said arm 39 on moving to its initial position overcoming the force of the spring 70 and serving as means for retaining the shoe 58 in its initial position until the lever arm 49 is again operated.

Upon the side of the frame of the machine I provide a stop 74 of any suitable character to arrest the lever arm 49 when it reaches its lower position, the said lever arm 49 always moving to a fixed predetermined position.

The shoe 51 hereinbefore referred to extends transversely of the forward portion of the machine and directly in front of the front edge of the concave bed 21 when the latter is in its depressed position, said shoe being upon a supporting member 75 and adapted to be moved rearwardly when the bed 21 is depressed so as to fold the forwardly projecting end of the strip 18 over upon the upper surface of the platen or presser 34. The roller 52 is substantially in line with the shoe 51 and is normally upon a supporting plate 76 and said roller 52 is when the concave bed 21 is depressed substantially in line with the upper rear edge of said bed and in position when driven forwardly to engage the rearwardly projecting end of the strip 18 and fold the same over upon the presser or platen 34 and upon the then rearwardly folded forward end of the strip 18, as shown in Fig. 4. The roller 52 when moving forwardly to the position shown in Fig. 4 rolls upon the rear portion of the strip 18 and in doing so causes said rear end of said strip to be withdrawn from below the moistening shoe 58, the spring pressure upon said shoe upon said end of said strip being insufficient to prevent the roller 52 from folding the rear portion of the strip 18 upon the upper surface of the presser or platen 34 and upon the rearwardly folded forward end of said strip.

The shoe 51 is connected by a link 77 with the upper end of a pivoted lever arm 78 and said shoe is given a downward tension by means of a spring 79 connected with said link and with said lever arm, as shown in Fig. 3. The lever arm 78 is pivoted, as at 80, in a bearing lug and its lower end has pivotally connected with it a rod or link 81 which extends rearwardly and carries a small roller or pin 82 to coöperate with a cam 83 of a segment 84, a spring 85 serving to keep said roller or pin 82 against said cam. Upon the segment 84 is secured a laterally extending pin 86, and said segment is pivotally mounted upon a transverse shaft 87 which extends through a slot in the rear end of the link 81, as shown in Fig. 4, and permits said link to have a reciprocating movement sufficient for the operation of the lever 78. The segment 84 is pivotally connected with the lower end of an upwardly extending lever arm 88 whose rearward movement is limited by a stop pin 89 (Fig. 4) and whose actuation is effected from the cam 47 to which said arm is connected by means of a pin or screw 90 extending through a slot 91 in the upper end of said arm 88. When the manually operative arm or lever 49 is turned downwardly it at the proper time acts through the arm 88 to turn the segment 84 carrying the cam 83 forwardly and during this operation the cam 83 first acts against the roller or pin 82 to move the link 81 forwardly in opposition to the force of the spring 85 and for the purpose of causing the shoe 51 to move rearwardly and fold the forwardly projecting end of the binding strip 18 over upon the presser or platen 34 and then to carry the pin 86 against a pivoted link 92 connected by an arm 93 with the carrier for the roller 52 for the purpose of moving said roller forwardly and causing it to fold the rearwardly projecting portion of the binding strip 18 over upon the upper surface of the presser or platen 34 and upon the then rearwardly folded-over front end of said strip. The arm 92 has a spring 94 connected with it and this spring is placed under tension as the roller 52 is moved forwardly and finally the spring 94 serves to return the roller 52 and arm or link 92 to their rear position shown in Fig. 3. The pin 86 is normally spaced from the arm or link 92, as shown in Fig. 3, so that the cam 83 may act to move the shoe 51 rearwardly for folding down the front end of the binding strip 18 before the pin 86, coöperating with the arm or link 92, drives the roller 52 forwardly to fold over the rear end of the strip 18. The roller 52 does not rotate on its forward motion, but acts as an iron for ironing down the moistened rear end of the binding strip 18, but does rotate on its rearward motion, then rolling over the ironed down end of the strip 18. The roller 52 is prevented from rotating while on its forward stroke by means of a small brake roller 95 of known character, said roller 95 permitting the roller 52 to turn during its rear stroke. The cam 83 and segment 84 effect the movement to their operative position of the shoe 51 and roller 52 and these features are returned to their inoperative position, shown in Fig. 3, by the springs 85, 94, respectively. The cam 83 and segment 84 are in one integral piece and on the shaft 87.

The spring 70 is connected at one end with the bell-crank plate 69, as shown in Fig. 1, and at its other end said spring is connected with the outer end of an arm 96 which is fastened to and extends rearwardly from the branch 39 of the platen operating arm 35.

In addition to binding the strip 18 around the flexed bundle of bills 22, I preferably date said strip so as to indicate when the operation of bundling the bills took place, and to this end I mount within the box-like section 20 of the machine frame and below the bed-plate 21 an inking roller 97 and a dating stamp 98 of the usual wheel type to be set at any date required, said inking roller being mounted on a pivoted frame 99 against which a spring 100 acts to normally throw the inking roller forwardly. The dating stamp 98 has a frame 101 which is carried by a pivoted arm 102 against which a spring 103 is flexed with a tendency to turn said arm 102 and stamp frame 101 upwardly or to the position shown in Fig. 4. The arm 102 has a chain 104 (Fig. 2) connected with it to limit the upward movement of the dating stamp 98. The arm 102 is pivotally mounted at its upper end in a bracket 105 connected with an integral depending portion of the frame of the bed-plate 21, as shown in Fig. 3. In the normal condition of the parts, shown in Fig. 3, the dating stamp is in its lower position and the ink roller 97 is held against the type 98 of said stamp by means of the spring 100. When the machine is operated and the bed-plate 21 is depressed due to the action of the platen or presser 34, the bracket 105 is moved downwardly, and due to this action and the action of the spring 103 the stamp frame 101 is caused to move vertically, riding against the ink roller 97, as shown in Fig. 4, and when the bed-plate 21 is caused to ascend, after the elevation of the presser or platen, 34, the bracket 105 elevates and by pulling upwardly on the forward end of the arm 102, causes the rear lower end of said arm to move downwardly, and this restores the stamp frame 101 to its former position with the type 98 against the ink roller 97. It will be observed that the dating of the binding strip 18 is not performed until after said strip has been folded upon the bundle of bills 22 and presser or platen 34, this being just prior to the elevation of the lever arm 49 for setting all of the mechanism of the machine into the normal position of the same. The bed-plate 21 has an opening formed in it for the spring finger 33, and this opening also serves as a passage for permitting the type 98 of the stamping frame 101 to reach the lower surface of the binding strip 18 then with the bundle of bills 22 pressed against the bed-plate 21.

I will preferably equip the frame of the machine with a forwardly projecting sponge cup or receptacle 106 (Fig. 1) to enable the user of the machine to moisten his fingers when necessary and thus facilitate the removal of the binding strips 18 from the various receptacles 17 formed in the base portion of the machine.

The operation of the machine will be substantially fully understood from the detailed description hereinbefore presented, and hence it will be unnecessary to refer in specific detail to the various features of construction and operation. I have shown the handle or lever 49 by means of which the entire operation of the machine is carried on, as intended for manual operation, but I do not desire to limit myself to the operating of the machine manually, since a motor may be easily applied for operating the same. When a bundle of bills is to be banded, the appropriate strip 18 is withdrawn from its receptacle 17 and placed on the tables or bed-plates 31, 32 provided therefor and extended across the bed-plate 21, the gummed end of the strip being placed on the table or bed 32 and against the spring 60 with the gummed surface facing upwardly. After the placing of the binding strip 18 in position, the bundle of bills or the like is placed on said strip and above the bed-plate 21, the bundle of bills extending transversely of the strip and lengthwise of the bed-plate. Thereafter the lever or handle 49 is turned forwardly and downwardly to effect the moistening of the rear end of the binding strip 18, for depressing the platen or presser 34 against the bundle of bills then on the binding strip and causing said binding strip and bundle to be depressed against the concave bed-plate 21, for depressing said bed-plate 21 so that the folders or shoe 51 and roller 52 may, one after another, turn the respective ends of the binding strip 18 over upon the top of the platen 34 and finally for effecting the dating of the band or binding strip by means located below said bed-plate 21.

After the band 18 has been secured around the bundle of bills and platen 34 and the handle or lever arm 49 is turned upwardly and rearwardly so as to permit the elevation of the platen 34 carrying the bills hung to its lower surface, the bundle of bills is withdrawn laterally of the machine from off the platen, and transversely flattened out to remove the concavity therein formed by the bed 21 and platen 34, the band then closely binding the bundle and all slackness therein being taken up. The bundles of bills are one after another banded by the machine of my invention with considerable rapidity and the ends of the bands are secured by pasting, thus avoiding the use of pins or metal fasteners of any kind or any fastening means which might, if used, leave projecting edges or lips on the bills, it being highly desirable that the bundles of bills present smooth exterior surfaces so that they may be readily packed without danger of the binding on one bundle getting caught on the binding of an adjacent bundle.

I have presented herein the best form of the invention, both in its details and general features known to me, but I do not desire to limit my invention to the structural forms and details described, since I am aware that without departing from my invention my machine may be modified in many ways within the scope of the appended claims.

What I claim as my invention and desire to secure by Letters-Patent, is:
1. A banding machine of the character described comprising a bed having a concave face transversely across which a banding strip may be extended and against which strip and bed a bundle of bills to be banded may be placed, a presser or platen having a convex face to engage said bundle and an outer face upon which the end portions of said strip may be folded in overlapping relation and secured together, means for moving said presser or platen forcibly against said bundle of bills to concave the same preparatory to the ends of the strip being secured together on the outer face of said presser or platen, and in combination and coöperating therewith means for rendering one end of said strip adhesive, means for folding one end of said strip over upon said presser or platen and means for then folding the other end of said strip over upon said first folded end of the strip and pressing said ends together upon the presser or platen so as to effect their firm adherence to each other.

2. A banding machine of the character described comprising a bed having a concave face transversely across which a banding strip may be extended and against which strip and bed a bundle of bills to be banded may be placed, a presser or platen having a convex face to engage said bundle and an outer face upon which the end portions of said strip may be folded in overlapping relation and secured together, means for moving said presser or platen forcibly against said bundle of bills to concave the same preparatory to the ends of the strip being secured together on the outer face of said presser or platen, and in combination and coöperating therewith means for moistening a gummed end of said strip so as to render the same adhesive, means for folding one end of said strip over upon said presser or platen and means for then folding the other end of said strip over upon said first folded end of the strip and pressing said ends together upon the presser or platen so as to effect their firm adherence to each other.

3. A banding machine of the character described comprising a bed having a concave face transversely across which a banding strip may be extended and against which strip and bed a bundle of bills to be banded may be placed, a presser or platen having a convex face to engage said bundle and an outer face upon which the end portions of said strip may be folded in overlapping relation and secured together, means for moving said presser or platen forcibly against said bundle of bills to concave the same preparatory to the ends of the strip being secured together on the outer face of said presser or platen, and in combination and coöperating therewith means for rendering one end of said strip adhesive, means for folding the non-adhesive end of said strip over upon said presser or platen and means for folding the adhesive end of said strip over upon the non-adhesive end thereof and ironing the same down thereon.

4. A banding machine of the character described comprising a bed having a concave face transversely across which a banding strip may be extended and against which strip and bed a bundle of bills to be banded may be placed, a presser or platen having a convex face to engage said bundle and an outer face upon which the end portions of said strip may be folded in overlapping relation and secured together, means for moving said presser or platen forcibly against said bundle of bills to concave the same preparatory to the ends of the strip being secured together on the outer face of said presser or platen, and in combination and coöperating therewith means for rendering one end of said strip adhesive, means for folding the non-adhesive end of said strip over upon said presser or platen and means comprising a roller and connections for driving the same in a horizontal direction for folding the adhesive end of said strip over upon the non-adhesive end thereof and ironing the same down thereon.

5. A banding machine of the character described comprising a bed across which a banding strip may be extended and against which strip and over which bed a bundle of bills to be banded may be placed, a presser or platen to engage said bundle and having an outer surface upon which the end portions of said strip may be folded in overlapping relation and secured together, means for moving said presser or platen forcibly against said bundle of bills preparatory to the ends of the strip being secured together on the outer face of said presser or platen, and in combination and coöperating therewith means for rendering one end of said strip adhesive, means for folding one end of said strip over upon said presser or platen, and means for then folding the other end of said strip over upon said first folded end of the strip and pressing said ends together upon the presser or platen so as to effect their firm adherence to each other.

6. A banding machine of the character described comprising a bed across which a banding strip may be extended and against which strip and over which bed a bundle of bills to be banded may be placed, a presser or platen to engage said bundle and having an outer surface upon which the end portions of said strip may be folded in overlapping relation and secured together, means for moving said presser or platen forcibly against said bundle of bills preparatory to the ends of the strip being secured together on the outer face of said presser or platen, and in combination and coöperating therewith means for rendering one end of said strip adhesive, means for folding one end of said strip over upon said presser or platen, means for then folding the other end of said strip over upon said first folded end of the strip and pressing said ends together upon the presser or platen so as to effect their firm adherence to each other, and means below said bed for automatically imprinting on said band when said presser or platen is depressed against the bundle of bills, said bed having an opening in it through which the imprinting mechanism may act.

7. A banding machine of the character described comprising a bed across which a banding strip may be extended and against which strip and over which bed a bundle of bills to be banded may be placed, a presser or platen to engage said bundle and having an outer surface upon which the end portions of said strip may be folded in overlapping relation and secured together, means for moving said presser or platen forcibly against said bundle of bills preparatory to the ends of the strip being secured together on the outer face of said presser or platen, and in combination and coöperating therewith means for moistening a gummed end of said strip so as to render the same adhesive, means for folding the non-adhesive end of said strip over upon said presser or platen and means for folding the adhesive end of said strip over upon the non-adhesive end thereof and pressing the same down thereupon so as to effect their firm adherence to each other.

8. A banding machine of the character described comprising a bed across which a banding strip may be extended and against which strip and over which bed a bundle of bills to be banded may be placed, a presser or platen to engage said bundle and having an outer surface upon which the end portions of said strip may be folded in overlapping relation and secured together, means for moving said presser or platen forcibly against said bundle of bills preparatory to the ends of the strip being secured together on the outer face of said presser or platen, and in combination and coöperating therewith means for moistening a gummed end of said strip so as to render the same adhesive, means for folding the non-adhesive end of said strip over upon said presser or platen and means for folding the adhesive end of said strip over upon the non-adhesive end thereof and pressing the same down thereupon so as to effect their firm adherence to each other, and said means for moistening the gummed end of said strip comprising a receptacle containing a moist body, a shoe and means for moving said shoe from engagement with said moist body and into engagement with the gummed end of said strip and then back to its position in engagement with said moist body.

9. A banding machine of the character described comprising a bed across which a banding strip may be extended and against which strip and over which bed a bundle of bills to be banded may be placed, a presser or platen to engage said bundle and having an outer surface upon which the end portions of said strip may be folded in overlapping relation and secured together, means for moving said presser or platen forcibly against said bundle of bills preparatory to the ends of the strip being secured together on the outer face of said presser or platen, and in combination and coöperating therewith means for moistening a gummed end of said strip so as to render the same adhesive, means for folding the non-adhesive end of said strip over upon said presser or platen and means for folding the adhesive end of said strip over upon the non-adhesive end thereof and pressing the same down thereupon so as to effect their firm adherence to each other, and said means for moistening the gummed end of said strip comprising a receptacle containing a moist body, a shoe having recesses in its lower surface and means for moving said shoe from engagement with said moist body and into engagement with the gummed end of said strip and then back to its position in engagement with said moist body, said recesses serving to aid in moistening the end of the strip and also in releasing said end of said strip when the folding means engage the strip to fold the adhesive end thereof over upon the non-adhesive end of said strip.

10. A banding machine of the character described comprising a bed across which a banding strip may be extended and against which strip and over which bed a bundle of bills to be banded may be placed, a presser or platen to engage said bundle and having an outer surface upon which the end portions of said strip may be folded in overlapping relation and secured together, means for moving said presser or platen forcibly against said bundle of bills preparatory to the ends of the strip being secured together on the outer face of said presser or platen, and in combination and coöperating therewith means for rendering one end of said strip adhesive, means for folding one end of said strip over upon said presser or platen, and means for then folding the other end of said strip over upon said first folded end of the strip and pressing said ends together upon the presser or platen so as to effect their firm adherence to each other, and said means for folding the ends of the strip comprising operative mechanism having a shoe and roller respectively at the respective ends of said bed and acting one in advance of the other for folding the ends of the strip over upon said presser or platen, the roller for pressing the adhesive end of the strip upon the non-adhesive end thereof having a longer stroke than the shoe for folding the non-adhesive end of the strip upon said presser or platen.

Signed at New York, in the county of New York and State of New York, this 18th day of October, A. D. 1915.

CHARLES S. BATDORF.

Witnesses:
ARTHUR MARION,
CHAS. C. GILL.

Copies of this patent may be obtained for five cents each, by addressing the "Commissioner of Patents, Washington, D. C."